United States Patent [19]

Tymes

[11] Patent Number: 4,628,466
[45] Date of Patent: Dec. 9, 1986

[54] METHOD AND APPARATUS FOR PATTERN FORMING

[75] Inventor: LaRoy Tymes, San Jose, Calif.

[73] Assignee: Excellon Industries, Torrance, Calif.

[21] Appl. No.: 665,930

[22] Filed: Oct. 29, 1984

[51] Int. Cl.⁴ .................. G06F 15/60; G06F 15/62
[52] U.S. Cl. .......................... 364/521; 346/110 R; 364/491; 364/571
[58] Field of Search .................. 315/10, 368, 371; 340/724, 728; 346/110 R; 364/491, 518, 521, 571

[56] References Cited

U.S. PATENT DOCUMENTS

| | | | |
|---|---|---|---|
| 3,131,020 | 4/1964 | Bertram et al. | 346/110 V |
| 3,225,137 | 12/1965 | Johnson | 346/110 R |
| 3,686,675 | 8/1972 | Faul et al. | 346/110 R X |
| 3,689,932 | 9/1972 | Gerber | 346/110 R X |
| 4,099,092 | 7/1978 | Bristow | 315/10 |
| 4,203,051 | 5/1980 | Hallett et al. | 315/370 X |
| 4,279,483 | 7/1981 | England et al. | 354/5 |
| 4,335,333 | 6/1982 | Ramsay et al. | 315/371 |
| 4,335,390 | 6/1982 | Axford | 346/100 R X |
| 4,422,019 | 12/1983 | Meyer | 315/368 |
| 4,511,980 | 4/1985 | Watanabe | 364/491 |
| 4,518,898 | 5/1985 | Tarnowski et al. | 315/371 |

OTHER PUBLICATIONS

"The Forgotten Fiber-Optic Application" by Jim Wurtz of Litton Electron Tube Division; 960 Industrial Road, San Carlos, California 94070 (paper).
Kodak publication No. G-122 entitled: "Photoplotting Desk Reference", published by Graphics Markets Division, Eastman Kodak Company, Rochester, New York 14650.
Gerber brochure entitled: "Gerber PC 800 Model 2 of the Gerber Scientific Instrument Comapany", 83 Gerber Road, South Windsor, Connecticut 06074.
Brochure entitled: "Litton Fiber Optic Cathode Ray Tubes of Litton Electron Tube Division", San Carlos, Ca., 9600 Industrial Roads, San Carlos, California 94070.

Primary Examiner—Parshotam S. Lall
Assistant Examiner—Edward R. Cosimano
Attorney, Agent, or Firm—Gausewitz, Carr & Rothenberg

[57] ABSTRACT

A cathode ray tube with a fiber optic faceplate is successively stepped to discrete adjoining areas of a photosensitive film upon which a pattern is to be exposed. The pattern is divided into a plurality of sections, which are exposed upon the film by the cathode ray tube one at a time at its successive positions. In each position of the cathode ray tube, its beam traces a pattern of light upon its faceplate that corresponds to one section of the overall pattern. The pattern of light traced on the faceplate is transmitted directly to the film which is in contact with the fiber optic faceplate. As each pattern section is formed on the faceplate, correction signals are applied to the beam deflection circuits so as to shift all or portions of the pattern formed on the faceplate in a sense to decrease misalignment due to error in position of the cathode ray tube and, moreover, to correct for deviations in the position of the beam trace upon the faceplate caused by static errors that are due to construction of the cathode ray tube.

33 Claims, 7 Drawing Figures

METHOD AND APPARATUS FOR PATTERN FORMING

BACKGROUND OF THE INVENTION

The present invention relates to methods and apparatus for pattern generation, and more particularly concerns improved methods and apparatus for rapid formation of patterns of high precision by a combination of mechanical and electrical drive.

In the manufacture of printed circuit boards, a circuit pattern is often produced as a high quality black-and-white image on photographic film or plate and transferred to a coated substrate. Features in such an image may have a positional accuracy of 0.001 inch over a distance of a much as 30 inches. The image on such film may be produced by a photoplotter comprising a light source, a lens system, a shutter, and a set of apertures for use in exposure of the film. A photohead of the photoplotter is moved relative to the film by high precision mechanical positioning devices in two axes and in two modes. In a "flash" mode, the shutter is opened and closed while the photohead is stationary to produce an image of a selected aperture at a particular position on the film, and then the photohead is moved to the next position, with closed shutter, where a second flash is caused. In a "draw" mode, the shutter is left open while the photohead is moved to draw a line of a width determined by the diameter of the selected aperture.

A major problem with such photoplotters is that they are very slow. If the image is of high density (more than 100 features per square inch) and large (several square feet), the image may take hours to produce. Many applications require several pieces of film for one job, and more jobs may require several days of continuous plotting for completion. A second problem is lack of versatility. The photohead can carry only a limited set of apertures of different sizes and shapes and is, therefore, unsuited for applications requiring a broad range of image features, such as phototypesetting. A third problem is the high degree of mechanical perfection required. In order to achieve desired positioning accuracy of features in the image, position of the photohead must be carefully maintained whenever the shutter is open. Maintenance of the position in the draw mode is even more difficult, because the photohead is in motion.

There have recently been developed precision photoplotters employing lasers to scan the film. The laser beam is rapidly turned on and off to produce dark and light areas as it scans, frequently in a rectangular raster. Since the image is produced in a raster mode rather than a vector mode, as is commonly used in photoplotters, the digital data must be converted into the raster format, a process that may take considerably longer than the plot itself. The amount of prior data processing required for this conversion varies with the square of the resolution of the raster. Precisely pointing the laser beam over a large area and modulating it on and off at exactly correct times may present problems as difficult as the mechanical problems of the traditional photoplotter.

Phototypesetters will generally expose a single line of print at a time, with the paper moving transversely to the line for exposure of successive lines. In a phototypesetter, one is concerned primarily with producing a high quality image, but geometric precision and precision positioning of the second images are of little concern and are not available.

Accordingly, it is an object of the present invention to provide a precision image-forming method and apparatus that avoids or minimizes above-mentioned problems.

SUMMARY OF THE INVENTION

In carrying out principles of the present invention in accordance with a preferred embodiment thereof, an energy beam generator, which my be a cathode ray tube having a small fiber optic faceplate, is successively positioned at each of a plurality of adjacent areas of an energy sensitive medium upon which a pattern is to be exposed. At each area of the medium, the energy generator stops, and a section of the overall pattern is caused to be traced on a target area or faceplate of the generator. The overall pattern to be exposed upon the medim is divided into a number of small pattern sections, and the beam generator is operated at each position to produce an individual one of such pattern sections in a position on the medium that is precisely aligned with other pattern sections that have been exposed on the medium. Mechanical positioning error of the energy beam generator, which tends to cause misalignment of one pattern section with respect to previously exposed pattern sections, is compensated for by measuring mechanical positioning error when the energy beam generator has come to a stop, and employing the measured error to electronically displace the entire pattern section, as traced by the energy beam on the beam generator target area, in a direction to decrease the measured mechanical positioning error. Static distortions in the image or pattern section traced by the beam on the target area are also corrected by operating the image generator to form a test pattern and measuring deviations of selected points of the test pattern from the nominal test pattern configuration. The measured deviations are used to compensate beam deflection signals during formation of an image by the energy beam.

DETAILED DESCRIPTION

In carrying out principles of the present invention in accordance with a preferred embodiment that is illustrated herein for purposes of exposition, a cathode ray tube, which images one small area at a time, is stepped over a photosensitive film in as many steps as needed to form a complete image or pattern on a film. The system is very fast, because imaging of any small area is done by electronically sweeping the electron beam of the cathode ray tube, and the tube makes only one pass over the film, regardless of density of image elements. The pattern forming capability is versatile, since almost any pattern can be formed with a cathode ray tube. Mechanical requirements are simplified, because imaging is performed only when the tube is stationary. Further, there is no requirement that the tube be moved to a precise position, but merely that its position, when achieved, be precisely known. Small positioning errors of the tube are measured, and the image on the tube faceplate is electronically shifted to minimize position error of the tube. No conversion to raster format is required, since the mechanical positioning of the tube and control of the cathode ray tube beam are readily achieved to provide the pattern generation by electronic motion in vector mode of the cathode ray tube beam.

Figure 1:
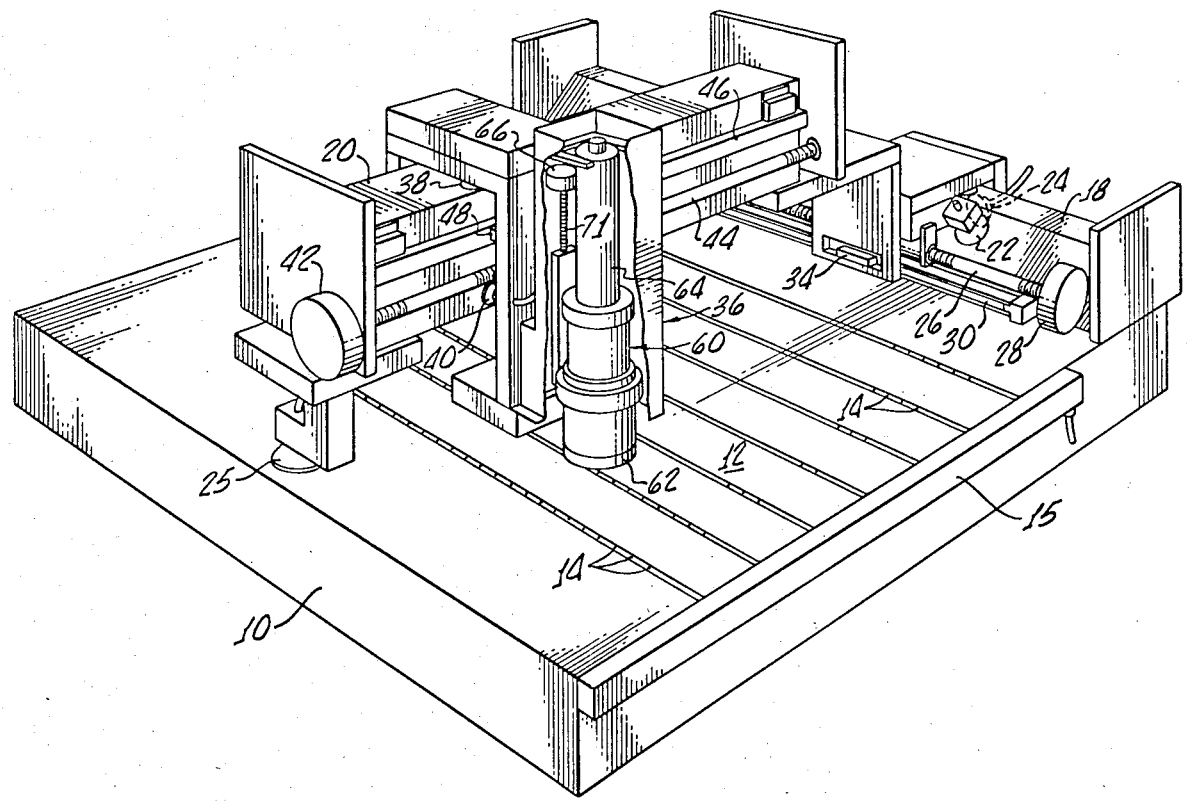
FIG. 1 is a pictorial illustration, with parts broken away, of an exemplary embodiment of apparatus incorporating principles of the present invention.

Presently preferred apparatus for practicing principles of the present invention is illustrated in FIG. 1. A massive fixed table 10, having a precisely flat upper surface 12 in which are formed a plurality of parallel rows of apertures 14 connected via passages in the table (not shown) to a vacuum manifold 15, provides a support for vacuum attachment of a photosensitive film or plate upon which a pattern, such as a printed circuit board pattern, is to be exposed. An X axis beam 18 extending along an X coordinate axis is fixed to the table and mounts one end of a Y axis beam 20 for slidable motion on the beam 18 in either direction along the X axis. Beam 20 is mounted on the X axis beam 18 by means of suitable bearings, which preferably are air bearings, such as those indicated at 22 and 24. The other end of the Y axis beam is slidably supported on the table by air bearing 25. Beam 20 is driven in either direction along the X axis beam by means of a screw 26 fixed to the beam 18 and engaging a nut (not shown) carried in beam 20. A motor 28 drives the screw, and an X axis position pickoff is provided in the form of an optical gauge or scale 30, which is fixed to and extends the full length of X axis beam 18, and a light emitting and light sensing diode assembly 34 by the beam 20.

A cathode ray tube housing and carriage 36 is mounted for linear travel along Y axis beam 20 by means of suitable bearings, such as air bearings 38, 40, and driven by means of a motor 42 fixed to the beam and a screw 44 journalled on the beam, with the screw threaded in a nut (not shown) carried by the housing and carrige 36. A Y axis optical pickoff, substantially indentical to the X axis pickoff, is provided in the form of an optical scale 46, fixed to and extending substantially the full length of the Y axis beam 20, which cooperates with a light emitting diode and a light sensitive diode assembly 48 carried by the housing and carriage 36.

Mounted in the housing and carriage 36 is an energy beam generator, preferably in the form of a cathode ray tube 60, having a fiber optic faceplate 62. To minimize effects of stray magnetic fields, the tube neck is circumscribed by one or two concentric magnetic shields 64. An additional outermost concentric magnetic shield (not shown) circumscribes substantially the entire tube, extending longitudinally from the faceplate to a point well past the center of the tube neck. The cathode ray tube includes conventional electron energy beam generating electrodes and deflection devices such as magnetic yokes or electrostatic deflection plates (not shown). The cathode ray tube is restrained against all horizontal motion relative to the housing and carriage 36, but is mounted therein by means (not shown) for a limited amount of vertical motion under control of a vertical drive motor 66 carried by the carriage housing and driving a screw 71 that is threadedly engaged with the cathode ray tube.

The face of the cathode ray tube is small, in the order of about two to three inches, having a circular configuration and being precisely planar both inside and out. As is common with a fiber optic faceplate, the cathode ray tube phosphor is deposited upon the inner surface of the faceplate, which is formed by the innermost ends of a large number of closely packed optical fibers. Preferably, the phosphor is of an extremely low permanence, so as to have an extremely short retention of its state of optical excitation. The vertically shiftable mounting of the cathode ray tube enables the faceplate to move vertically between an imaging position in which the faceplate, in the present embodiment, is in flat, direct face-to-face contact with the surface of the photosensitive medium (such as film) secured to the table, and one or more raised positions in which the faceplate clears the film to facilitate motion of the cathode ray tube across the film, or to clear a thicker photosensitive plate that may be used instead of the photosensitive film. Alternatively, the vertical motion of the tube may be eliminated and the tube floated upon the photosensitive film upon a thin cushion of inert gas.

It will be seen that the cathode ray tube can be moved in two dimensions across the surface of the sensitive medium, such as a photosensitive film or plate, that is secured to the table. The cathode ray tube housing and carriage is moved in discrete steps over the table surface, employing the X and Y drive motors 28 and 42 in conjunction with optical position feedback signals derived from the optical scales and sensor diodes. Although closed loop position control is employed, high pecision imaging is obtained with the use of relatively loose servo control of physical position of the housing and carriage, and therefore of the cathode ray tube itself. Electronic image positioning compensates for loose servos, and distortion controls compensate for distortions due to cathode ray tube characterisitcs as will be described more particularly below.

Figure 2:
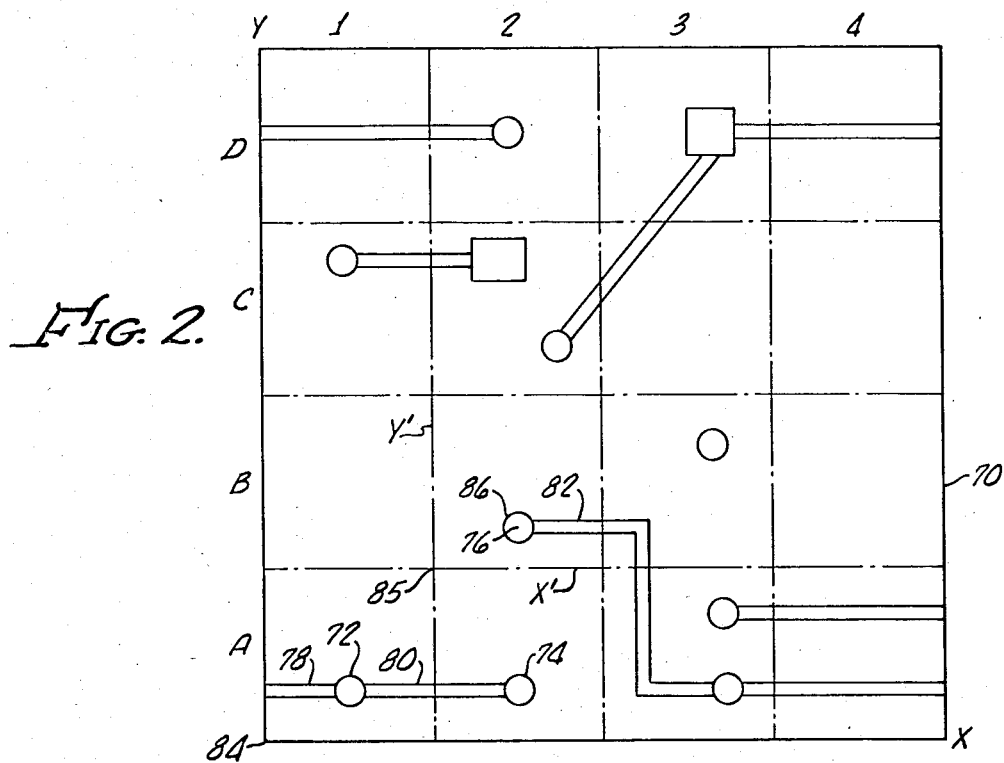
FIG. 2 illustrates an exemplary etched circuit pattern.

Illustrated in FIG. 2 is an exemplary rectangular pattern 70 to be used in making a printed circuit board, and having a plurality of pad areas 72, 74, 76 interconnected by lines 78, 80, and 82, among others. According to principles of the present invention, the overall pattern 70 is subdivided into a number of square sections or subsections, such as the 16 square sections illustrated in FIG. 2 for purposes of exposition. Each pattern section is in the order of one inch square in a presently preferred embodiment to correspond to and be congruent with a one inch square pattern that will be formed on the face of the cathode ray tube. Each of the exemplary 16 squares is desgnated as being in one of four columns, labeled 1 through 4, and in one of four rows, identified as A through D. Since an actual machine embodying principles of the present invention is capable of forming a single overall pattern in the order of several feet square (depending upon table size), it will be understood that a pattern of such larger size would be divided into many more than 16 one inch square subsections.

In forming the overall pattern with the apparatus illustrated in FIG. 1, the cathode ray tube is first moved to position it over an area of the photosensitive medium that corresponds to the pattern section identified as A1 (for row A and column 1). The illustration of FIG. 2 may be considered to be an illustration of the desired pattern as it is to be directly exposed upon the face of the photosensitive medium. Thus, in employing the apparatus of FIG. 1 to form a pattern such as that illustrated in FIG. 2, the cathode ray tube, with its beam blanked out, is raised slightly above the surface of the medium, moved to position it at section A1, and then lowered to place the fiber optic faceplate in direct face-to-face contact with the film surface. When the cathode ray tube motion has stopped and the apparatus is perfectly still, the cathode ray tube is operated to unblank its beam and to cause its deflection control circuits to move the projected electron beam over the tube target area formed by the inner surface of its fiber optic faceplate, so as to trace that portion of the overall pattern that is defined within the boundaries of section A1. Impingement of the scanning electron beam upon the inner surface of the faceplate causes a spot of light to scan the faceplate in the desired pattern section. The light is transmitted by the fiber optic faceplate directly to the surface of the photosensitive medium upon which the pattern section of section A1 is thus exposed.

Figure 3:
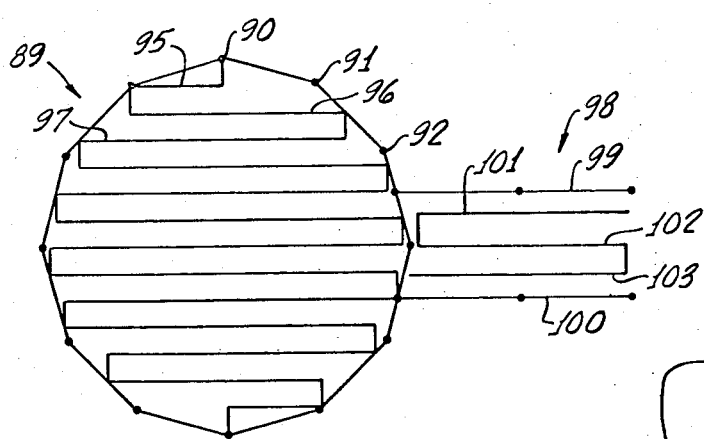
FIG. 3 illustrates a typical path of the energy beam traced in the course of forming elements of a pattern section.

Although many types of image forming data may be employed for image generation, in a preferred embodiment a vector mode is used in which each line of a pattern is divided into short segments of which each end is identified by x, y coordinates that are set forth in successive input data commands, together with a comman to turn the beam on (when tracing a line segment) or off (when shifting to another pattern element). To trace a circular pad 89 of 60 mils diameter, for example, as illustrated in FIG. 3, the beam (which is focused to form a spot of one mil diameter on the faceplate) is first moved to a point such as point 90 on the pad periphery, and then moved in successive straight line segments completely around the circular pad, to points 91, 92, etc., each of which is defined in the image forming data by a pair of x, y coordinates that are fed as analog signals to the tube deflection controls. After completing the trace of the pad perimeter, the beam is caused to fill in the interior (for a solid pad) by successively tracing mutually displaced lines such as those indicated at 95, 96, 97, which are shown as distinct, separated lines only for exposition. In an actual device, the fill-in lines are all mutually contiguous to provide the desired solid pad. A similar procedure is followed for tracing a straight line 98 of ten mils in width, for example. The beam first traces each of the short line segments making up one edge 99 of the line an then traces the segments of the other edge 100. Line 98 is then filled in by causing the beam to trace segments forming interior lines such as those designated at 101, 102, 103. During all of this operation of the tube, the tube and its carriage and housing remain stationary. Only the electron beam is moving to trace an image only within the boundaries of a single pattern section A1.

Upon completion of the exposure of the pattern section A1, the beam is blanked, the cathode ray tube is raised, moved to the next area of the film (which may be section A2, for example), lowered to provide the desired face-to-face contact between the fiber optic faceplate and the film, and when motion of the cathode ray tube has been completely stopped, the cathode ray tube is operated to expose upon the optically sensitive film that pattern section contained within the square section A2. This step and expose cycle is repeated for each pattern section, successively moving the cathode ray tube to each area of the film and, at each such area, exposing the film to the corresponding section of the overall pattern, until all sections of the overall pattern have been exposed upon the film. Only a single pass is required, since all elements of each section of the pattern are exposed on each exposure step. The cathode ray tube beam is disabled so that the faceplate is dark during all motion of the cathode ray tube. Only after motion of the cathode ray tube has been stopped is its electron beam deflected to a selected position and its intensity control energized to cause the beam to form a light spot on the faceplate.

In prior systems employing vector mode, a single coordinate system (a "pattern" coordinate system) is established for the entire pattern. Coordinates of all points for the entire pattern are expressed in the one pattern coordinate system. According to an important feature of the present invention, a number of "section" coordinate systems are established, there being a different section coordinate system for each pattern section. Coordinates of all points are expressed in the respective section coordinate system.

Referring to the pattern of FIG. 2, beam deflection coordinates are initially expressed in an X, Y pattern coordinate system having an origin at point 84, so that a point 86, for example, on the periphery of pad 76 has coordinates $x_1, y_1$ in the overall pattern coordinate system X, Y. As previously mentioned, each point at an end of each line segment is identified by its x, y coordinates in the pattern coordinate system X, Y. To enable the image generator to form an image corresponding to each of the individual pattern sections, such as sections A1, A2, etc., the pattern coordinate data for each pattern point in the overall pattern are transformed into section coordinate data for each point in an individual pattern section. The section coordinate data for each individual pattern section are expressed in a section coordinate system that is unique to the particular section. For example, to identify points in the pattern section B2, a section coordinate system X', Y' is established with its origin at a point 85, which is one corner of the pattern section. The section coordinate system X', Y' has its axes parallel to the axes of the pattern coordinate system X, Y, but its origin 85 is displaced from the pattern coordinate system origin 84 in X and Y by the extent of the length of one pattern section in each of the X and Y directions. The origin 85 of the section coordinate system X', Y' has coordinates $x_0, y_0$ in the pattern coordinate system X, Y. Accorindingly, the X coordinate $x'_1$ of point 92, expressed in the section coordinate system, is $x'_1 = x_1 - x_0$, and the Y coordinate $y'_1$ of point 92, expressed in the section coordinate system, is $y'_1 = y' - y_0$. Thus, data transformation of the line segment coordinates is simply a matter of calculating corrdinates in the pattern system X, Y of a like corner (lower left corner, for example) of each pattern section to thereby determine the pattern coordinates of all of the section coordinate system origins. Then, from these section coordinate system origins and the coordinate data expressed in the pattern system X, Y, the coordinates of each point expressed in each section coordinate system may be readily determined. Coordinates of the section coordinate system origins, as expressed in the pattern coordinate system, also are employed as positioning commands to the drive motors 28, 42 for stepping the cathode ray tube to its successive positions on the film.

With the cathode ray tube positioned at subsection B2, for example, the pattern section at this area may be formed on the cathode ray tube faceplate. This is achieved by feeding to the tube deflection control circuits coordinate information locating each of the points of this pattern section in the section coordinate system. For point 92, the cathode ray tube deflection circuits are energized by analog signals corresponding to coordinates $x'_i$ and $y'_i$. All other points within the pattern subsection $B_2$ are likewise defined and the beam deflected by coordinates in the section coordinate system $X'$, $Y'$. Similarly, an unique section coordinate system is employed for each pattern section.

The system, including the cathode ray tube, its mechanical and electronic positioning, and all of its motions and intensity, focusing and deflection controls, are controlled by a conventional computer programmed to calculate from input coordinate data the necessary commands for positioning the cathode ray tube in its step-by-step traverse over the film medium and for controlling for scanning of the electron beam over the cathode ray tube faceplate at each of the successive positions of the image generator. Input data also includes commands for blanking and unblanking, varying intensity and changing focus, if needed. Input data may all be specifically prepared for a given pattern to be exposed, including prior calculation of coordinate system origin coordinates and line segment coordinates in the section coordinate systems, with the data all organized in blocks, each of which is individual to a single pattern section. The computer stores the input data, as blocks of section coordinate data and related commands, and reads out the various commands for control of the machine motors and cathode ray tube to perform the operations described herein.

Various vector mode formats of data bases for photoplotters are known and have been used. Thus, as an alternative to calculating the above described input data directly from a pattern to be exposed, there may be employed a preexisting data base in a common photoplotter format, such as, for example, in the so-called Gerber format which is employed for control of Gerber photoplotters. Such data may be readily converted to the type of input data required for operation of the present invention. A typical series of commands embodied in a Gerber format data base for a Gerber photoplotter may be as follows: Select a small round shape of 0.012 inch in diameter. Move the photohead to a first point (identified in a pattern coordinate system) with aperture closed. Move the photohead with the selected aperture open from the present point to a second point (thereby drawing a line of the selected width between such points). Select a large round shape of 0.062 inch in diameter. Move to a third position with the shutter closed, and open the shutter at such third point (to thereby draw a solid round shape of 0.062 inch in diameter at such third point).

Modifying such a data base for use as input data to the described apparatus, a command to draw a line of a given width between given points is changed into a series of commands to draw a plurality of line segments, first along the outside edges of the line and then to fill in the line as previously described. In a like manner, a command of the prior data base to draw a solid round shape of a given diameter at a specific location is changed to a plurality of commands to draw a series of successive line segments extending around the perimeter of the solid shape, all centered upon the center of the solid shape, and an additional series of commands to fill in the interior of the perimeter thus drawn. The prior data identified in single pattern coordinate system is divided into data blocks, each corresponding to an individual one of the pattern sections in which the overall pattern is to be divided. Thus, it will be apparent that input data for operating the described machine may be derived either directly from a pattern to be exposed or from some type of previously prepared data base for such pattern.

Figure 4:
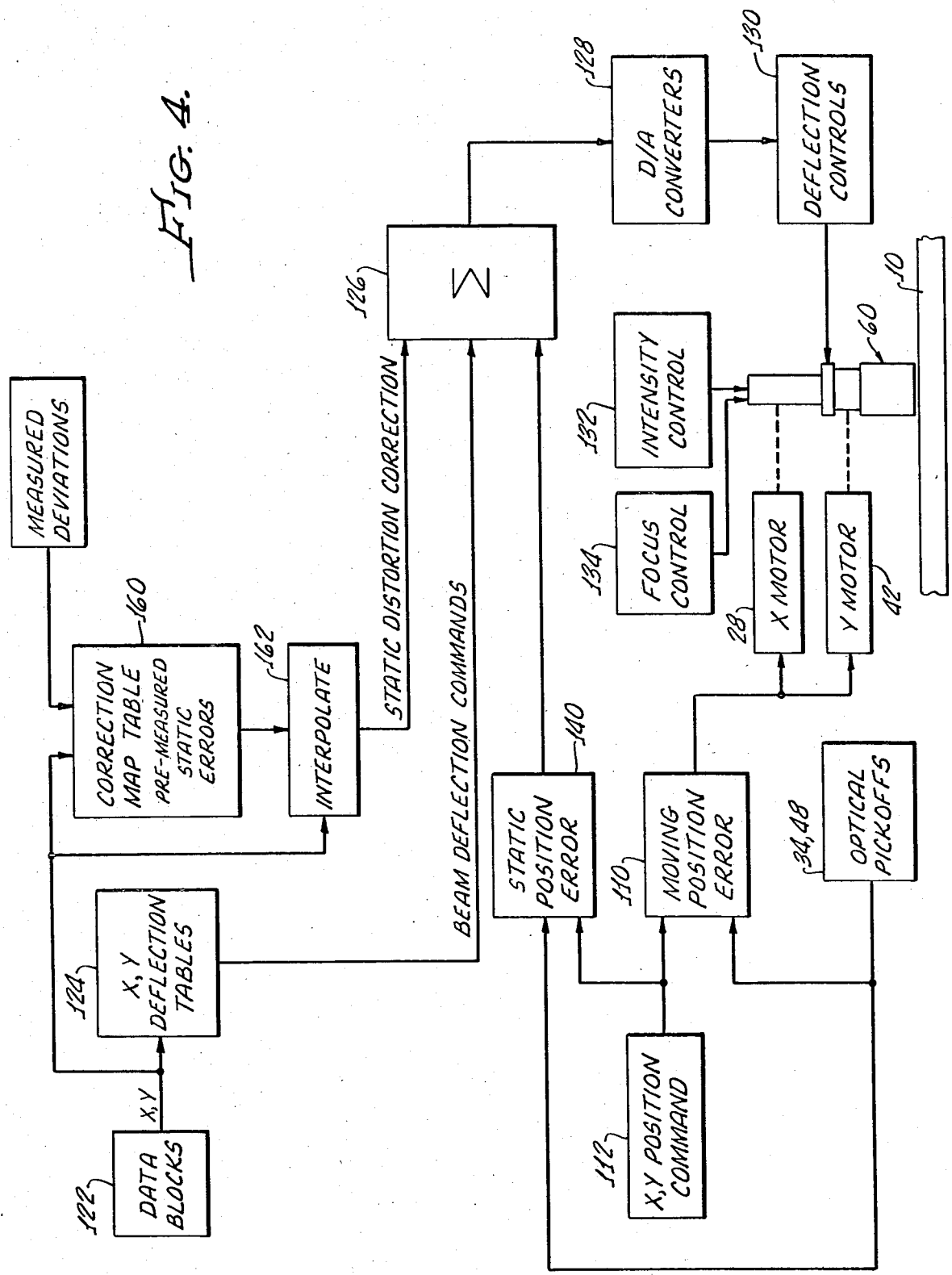
FIG. 4 is a functional block diagram of an embodiment of the invention.

Portions of a controlling computer are functionally illustrated in the functional block diagram of FIG. 4. The cathode ray tube 60 is moved along the table 10 under control of motors 28, 42 which are energized from a moving position error comparator 110 in response to motor commands stored in X, Y position command storage 112 of the controlling computer.

The X, Y cathode ray tube position commands, which define successive cathode ray tube positions in terms of coordinates of the origins of the respective section coordinate systems, are extracted from X, Y position command memory 112 and compared with X, Y feedback signals from the optical pickoffs 34, 48 in the moving position error comparator 110 which feeds X and Y error signals to the motors 28 and 42 to control their operation and move the cathode ray tube to the desired positions. Signals for raising and lowering the cathode ray tube are not illustrated in FIG. 4.

Section coordinates of each point of the pattern, and related blanking commands, are stored as data blocks, each of which is specific to an individual one of the subsections of the pattern. Deflection control signals corresponding to each pair of subsection coordinates x, y are stored in deflection tables 124, which are entered, for each point, with x, y section section coordinate data from the data blocks in storage 122 to provide beam deflection commands that are added to other deflection control signals (to be more particularly described below) in an adder 126. From the output of the adder the final deflection control signals are fed to digital-to-analog converters 128 which send appropriate analog signals to the deflection controls, such as the conventional magnetic yokes 130 of the cathode ray tube. All line segments are traced in the same fixed time interval, regardless of segment length. Therefore, the deflection control circuits for the X and Y beam deflections each includes an analog computer (not shown), responsive to the difference between coordinates of the two ends of a segment, that computes the rate of change of voltage required to deflect the electron beam from one end of the segment to the other in the common fixed time interval. Intensity control of the cathode ray tube is provided by controls 132 via computer commands, which, as previously described, blank the electron beam during motion of the cathode ray tube and control tube intensity in accordance with known techniques during the forming of an image on the cathode ray tube faceplate. Beam focus controls 134 are employed to vary the focus as necessary or desirable. For example, the focused beam that produces a one mil spot on the faceplate for tracing a pattern element outline may be slightly defocused or its intensity slightly increased to fill in traces with a larger spot within the outline.

Even with electromechanical servos of exceedingly high precision, it may be difficult, if not impossible, to physically position the cathode ray tube to enable it to trace an image section that is precisely aligned and registered with pattern sections that have been previously exposed upon the same film. However, neither precision servos nor precise mechanical positioning are required. According to a significant feature of the invention, the electromechanical positioning servos may be made relatively loose (subject to relatively large positioning error), and therefore of increased efficiency and speed, and extreme precision of pattern forming is still achieved.

Figure 5:
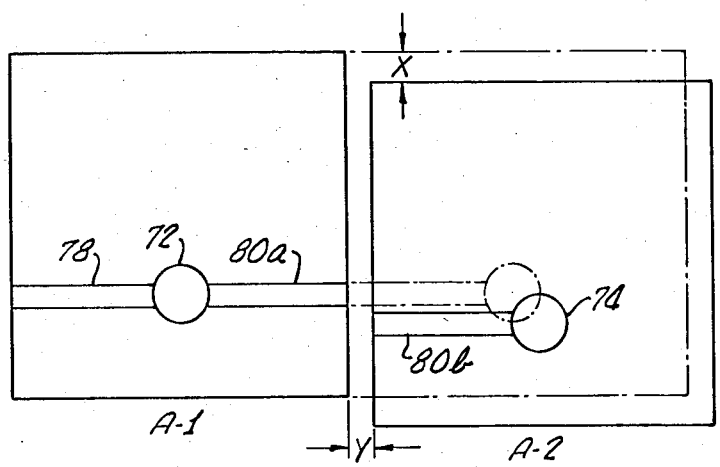
FIG. 5 is an enlarged illustration of portions of the pattern of FIG. 2, illustrating mechanical positioning error.

FIG. 5 illustrates an exaggerated mechanical positioning error. The cathode ray tube is operated to first form the image or pattern section within the boundaries of section A1, including pad 72, line 78, and a first section 80a of the line 80, which extends across the imaginery boundary between image sections A1 and A2. After exposing the image of the pattern section of section A1 upon the film, the cathode ray tube is moved to the position of section A2. But, as previously mentioned, the physical positioning may be such that when the cathode ray tube comes to rest it is displaced both in X direction and Y direction from the position in which section A2 would be precisely registered and in alignment with the adjoining section A1. If at this time the cathode ray tube were operated to expose the image section A2, pad 74 and a second section 80b of the line 80 that interconnects pads 72 and 74 would be displaced, as illustrated in solid lines in FIG. 5, from their nominal or desired positions (shown in phantom in FIG. 5). According to a feature of the invention, this physical displacement of the cathode ray tube from its nominal position when it has come to rest (purportedly but not acutally at its nominal position) is corrected by electronically shifting the entire image section of section A2 in a sense to decrease misalignment. This is achieved by using the same position pickoffs 34, 48 that are used for controlling the drive motors in the motor servo loop. With the cathode ray tube at rest, X and Y position error signals from the optical pickoffs are compared, respectively, with the X, Y cathode ray tube position commands in a static position error circuit 140 (FIG. 4), which provides a second input to the adder 126 in the form of static position error signals in X and Y that are each proportional to the difference between commanded and measured positions. This is achieved independently for each of the measured X and Y positions, although the drawing shows but a single static position error circuit. In effect, the system measures the positioning error caused by the lack of precision of the X and Y servos, after the cathode ray tube has come to rest, and provides fixed biases to each of the X and Y deflection controls. Each bias is of a magnitude and sense that tend to shift the entire pattern section relative to the cathode ray tube faceplate so as to precisely align the second pattern section A2 with the pattern section A1 that was exposed upon the film when the cathode ray tube was at a previous position.

In effect, the system employs coarse and fine image positioning to precisely locate each pattern section upon the film. Coarse positioning is achieved by mechanical operation of the X and Y servos which physically position the cathode ray tube. Fine positioning, which is accomplished after the coarse positioning has been achieved, is the electronic positioning or shifting of the entire pattern section relative to the cathode ray tube faceplate, which is carried out without motion of the cathode ray tube itself. This combination of electromechanical and electronic positioning of the pattern section not only enables use of faster, more efficient servos of less precision, but also minimizes or eliminates other positioning problems. Because the fine positioning takes place while the cathode ray tube is at rest, physical vibrations have settled and faded to substantially negligible proportions, and mechanical resonance and other problems of mechanical dynamics are avoided. The final positioning is accomplished in the absence of resonant vibrations and other dynamics of machine motion. It may be noted that the relative size of the cathode ray tube faceplate and the maximum pattern section to be traced thereon are such that a buffer area is provided on the faceplate entirely around the pattern section to enable bodily shifting of the pattern section as a whole relative to the pattern faceplate in a magnitude sufficient to compensate for expected and predetermined electromechanical positioning errors.

Figure 6:
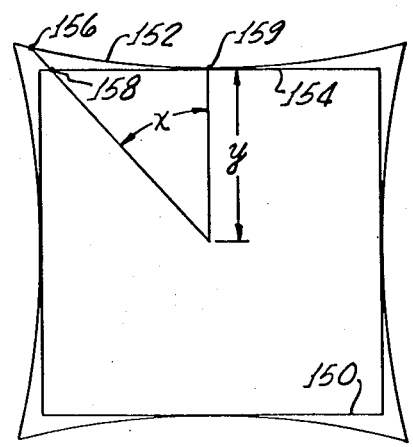
FIG. 6 illustrates one type of static image distortion.

Although the several pattern sections are positioned by the coarse and fine positioning described above, each pattern section is subject to static distortions due to characteristics of the tube. The several elements of each pattern section, such as various line segments that make up a circular pad or straight line for example, are electronically drawn by controlling electron beam deflection to cause the beam spot upon the faceplate to traverse the desired path. However, position of the point of impingment of the electron beam upon the cathode ray tube faceplate is not necessarily a predetermined or linear function of analog deflection voltages applied to the deflection control, because the cathode ray tube is subject to a number of what may be termed static errors of the beam positioning, which result in a distorted image. In such static distortion, there are included errors in construction of the tube, its magnetic deflection yoke, the tube support hardware, and its analog electronics. For example, the axis of the beam, namely the beam path with zero deflection applied to both X and Y deflection yokes, may be precisely normal to the flat surface of the faceplate. Further, the two deflection coils may not by precisely perpendicular to a normal to the faceplate, nor precisely perpendicular to each other or to the physical X and Y axes of the machine carriage and beams. An ideal structure is not physically possible to manufacture, and therefore, deflection signals fed to the cathode ray tube deflection controls that are calculated to produce, for example, a square pattern on the faceplate may acutally produce a pattern that is trapezoidal or otherwise distorted. Further, as previously mentioned, the faceplate, which is the target area of the beam, is flat on both interior and exterior surfaces. It is not curved, as in a common configuration of cathode ray tube display screens. Accordingly, when deflection signals that are fed to the deflection controls are produced of a magnitude to form a square, such as square 150 in FIG. 6, they will actually produce on the faceplate a distorted square having curved sides 152, rather than the straight sides required of the desired square. The illustrated distortion is exaggerated for exposition. For example, considering FIG. 6 to represent a view of the interior of a cathode ray tube faceplate from a point at the electron beam emitting cathode of the tube, one would attempt to trace a straight line 154 by using a fixed y deflection and varying the beam x deflection to sweep the beam across the faceplate along line 154 at a fixed distance from the faceplate center. However, because of the y deflection, the distance along the electron beam from the cathode to the faceplate at a midpoint 159 of the beam sweep (where x deflection is zero) is less than the length of the beam from the cathode to the faceplate when the x deflection is either of its maximum values or at any value other than zero. This is inherent in the geometry when using a flat faceplate. Accordingly, when the beam is at a large x deflection, such as the deflection x illustrated in FIG. 6, it will impinge upon the faceplate at a point 156 rather than at a point 158. Since this is true of all x deflections other than zero (for a given relatively large y deflection), the beam will trace a curved line, such as line 152, on the flat faceplate rather than a straight line. This is another one of the distortions inherent in characteristics of the tube that are termed static distortions.

For increased precision of the pattern section to be formed on the faceplate, compensation is also provided for these static distortions. Static distortions are individual to specific tubes, and each cathode ray tube is individually calibrated for its own unique static distortion compensation.

Figure 7:
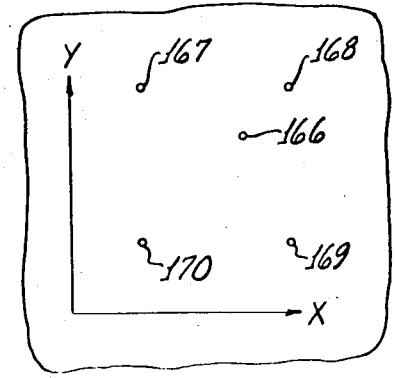
FIG. 7 illustrates interpolation of static distortion corrections.

To accomplish static distortion correction for an individual cathode ray tube employed in carrying out principles of the present invention, the tube is operated by deflection signals that would produce a predetermined nominal test or calibration pattern (if there were no static distortions) extending through a number of different points on the cathode ray tube faceplate. An image of this test pattern is exposed upon a photosensitive film, and, under high magnification, the distortions or deviations of the actual test pattern from the nominal test pattern are measured at each of a selected number of points, such as, for example, the points of a 128×128 matrix. It is not necessary to measure distortions at each or the possible points of impingement of the electron beam upon the pattern section. A number of points are selected and coordinate positions and deviation magnitude and sense are measured for each and stored in a correction map table 160. The correction map table is entered with the x, y coordinate positions of a given point, and the appropriate deviations or interpolated values thereof are extracted or computed, as functionally indicated at 162, to provide X and Y static distortion corrections to the adder 126. If interpolation is carried out for determining distortion corrections, it may be accomplished in any suitable manner. For example, as illustrated in FIG. 7, to determine distortion corrections for a point 166, the measured distortions at each of four points 167, 168, 169, and 170 at the corners of a small square surrounding point 166 (and at each of which x and y components of distortion have been measured) are applied for a linear interpolation of the x and y components of distortion at point 166. Thus, each set of beam deflection commands extracted from the deflection tables 124 is modified by a set of static distortion corrections and also by a set of static position error corrections by simply adding or subtracting the appropriate digital values to the digital deflection commands from the deflection table. The resulting deflection command signals fed to the digital-to-analog converters 128, and thence to the analog deflection controls 130, are thus compensated for measured electromechanical positioning errors of the cathode ray tube and for static distortions due to characterisitics of the individual cathode ray tube. Accordingly, the pattern section, such as section A2 shown in FIG. 5, is not only correctly positioned, registered, and aligned with previously imaged pattern sections, regardless of the servo positioning errors, but distortions in the pattern caused by individual tube characteristics are substantially decreased.

An alternative arrangement for measuring static distortions may take the form of an array of photosensitive diodes mounted below the surface of the table with a lens mounted in an aperture formed in the table for focusing a light spot from the cathode ray tube faceplate upon the diode array. Prior to forming a desired pattern, static distortions would be measured at each of a number of points at predetermined section coordinates by physically positioning the tube faceplate over the table aperture (with no film or other medium on the table surface) and moving the electron beam, point by point, to illuminate each of a selected group of programmed nominal points on the diode array. For each such programmed point the deviations of the actual point of illumination are measured by noting the particular diode or diodes illuminatd and storing these deviations in the correction map table 160.

PATTERN FORMING METHOD

Pattern forming, according to the presently preferred form of the invention, is carried out by performing steps substantially as follows:

1. Compute the section origin coordinates $X_0$, $Y_0$ for each section.
2. Separate the X, Y data (in the pattern coordinate system) into section data blocks for each section, utilizing the calculated origin coordinates for identification of the individual data blocks.
3. For each block compute and store the $x'_i$, $y'_i$ coordinate data (in the individual section coordinate system) for all points within the section, from the section origin coordinates and the x, y pattern coordinate data for each point.
4. Compute deflection control data for each pair of section coordinates of a pattern section and store in the X, Y deflection tables at the x, y address. (The same X and Y deflection tables are used for all pattern sections.)
5. Store a list of section coordinate system origins as X, Y position commands for positioning the cathode ray tube.
6. Form a test pattern, measure and store distortions at a selected number of points over the area of the test pattern, and store in the correction map table.

All of the above may be accomplished before beginning operation of the pattern forming process and may provide input data for operation of the system.

7. For operation of the cathode ray tube, feed a first set of X, Y position commands to the motors, employing the optical feedback to position the cathode ray tube at a first pattern area of the film.
8. When the cathode ray tube has stopped, as indicated by signals in the positioning servos, select the data block for the present cathode ray tube position and turn on the deflection circuits and intensity controls (although beam intensity is not turned up until the beam has been deflected to a point at which a line segment is to be drawn on the pattern section).
9. Read the $x'_i$, $y'_i$ section coordinates point by point from the selected data block.
10. Use each $x'_j$, $y'_j$ to fetch the deviation signals from the correction map table and interpolate to obtain the static distortion correction for the particular beam deflection set.
11. Read the beam deflection command set from the deflection tables.
12. Read the optical pickoff signal and compute the static position error.
13. Combine the static distortion correction, the static position error, and the beam deflection commands to obtain the corrected deflection signals for each point.

14. Use the corrected deflection signal to deflect the electron beam.
15. Repeat steps 9 through 14 for each point in the data block corresponding to the image section being formed.
16. After extracting and employing the last set of beam deflection commands, blank the tube and return to step 7 to move the cathode ray tube to the next position.

Instead of raising the cathode ray tube from the table during the course of its traverse and then moving it back down to contact the film when its selected position has been obtained, a ring may be fixed to the periphery of the cathode ray tube faceplate having a plurality of apertures through which a pressurized inert gas, such as nitrogen, is projected to form a thin gas-bearing cushion between the faceplate and the optically sensitive film. In such an arrangement, the vertical lifting and lowering of the cathode ray tube between each pattern section image forming is eliminated, and thus speed of the entire operation is considerably increased. However, the presence of the gas cushion, however thin, decreases resolution of the image exposed upon the sensitive film, and thus choice between the gas cushion or the vertically shiftable cathode ray tube involves a trade-off between pattern forming precision and pattern forming speed. At present, it is believed that pattern forming speed is adequate with a vertically shiftable cathode ray tube, and thus the latter is preferred because of its increased precision. Where the vertically movable cathode ray tube is employed, the vertical drive motor of the cathode ray tube is operated to raise or lower the tube at appropriate points in the above-described series of steps.

It will be readily understood that intensity of the beam may be varied at different points in the formation of an image section on the cathode ray tube faceplate, as may be deemed necessary or desirable. For example, where the machine provides for a fixed time internal in which to move the beam along a given line segment, regardless of the length of the line segment, the speed of travel of the point of impingement of the beam over the faceplate is greater for a longer line than for a shorter line. Accordingly, beam intensity may be decreased for the shorter line because of the longer dwell time of the beam upon the faceplate. Further, beam intensity may be slightly decreased for increased precision of forming a relatively fine line or for forming the outline of a solid pad, whereas, for filling in the interior of a solid pad, beam intensity may be increased (or the beam may be slightly defocused), since precision of illumination of the sensitive film within the area of the pad is not of great significance.

It will be readily appreciated that many embodiments and alternative arrangements of the described apparatus and system may be employed to carry out principles of the present invention. Other two dimensional drive structures for achieving relative motion of the cathode ray tube and film may be employed. For example, the cathode ray tube may be fixed and the table moved in X and Y relative to the tube, or the tube may be moved in one dimension and the film and its support in the other. Thus, the table may take the form of a rotating drum carrying the film, with the cathode ray tube being shiftable parallel to the drum axis. Instead of employing a fiberglass faceplate, a plain glass faceplate may be used on the cathode ray tube by projecting its image through a lens onto the film. Such an arrangement would provide higher resolution, but poor optical efficiency, because the lens is able to capture only a small percentage of the total light. This would greatly decrease plotting speeds, reducing a primary advantage of the described plotter, which is its high speed. In a presently preferred embodiment, employing a vertically shiftable cathode ray tube, the apparatus is capable of exposing one pattern section (one inch square) per second. Physical positioning of the cathode ray tube, including raising, lowering and laterally shifting the tube, requires about one half second, and the forming of a single pattern section on the cathode ray tube faceplate similarly requires about one half second. Accordingly, the formation of a complete image 20 inches by 20 inches can be performed in less than seven minutes.

Principles of the present invention are also adaptable for use with an image generator in which an electron beam impinges directly upon a workpiece, which itself forms the beam target area, with the beam being deflected to form an image section by conventional beam deflection controls. In the absence of a faceplate, both the cathode ray tube and the workpiece, relative to which the cathode ray tube is movable in two dimensions, are contained within a vacuum chamber during pattern forming.

There have been described methods and apparatus for rapid precision forming of patterns by employing an energy generator stepped over the surface of a sensitive medium in a number of discrete steps to form at each medium area a single section of an overall pattern. Means are provided for coarse and fine positioning of the image generator to provide precision of alignment of each image section with each other image section and to compensate each image section for various distortions inherent in the beam generator. Although an image generator having a larger area of faceplate or target area would increase speed of operation of the machine in the forming of a complete pattern, it is presently preferred to employ an image generator with a faceplate or target area that will form image sections of one to one and a half inches square. An image generator capable of producing an image larger than about one and a half inches square is extremely difficult to control for achievement of desired precision. As diameter of the faceplate increases, the difficulty of manufacturing a faceplate sufficiently free of defects greatly increases. Similarly, the magnitude of other errors increases with increase in tube size, and cost of the tube rises with increase of faceplate diameter, because of severe manufacturing problems. Use of fiber optic faceplate is preferred at present to the use of a lens with a plain glass faceplate, because the fiber optic faceplate is as much as thirty times more efficient in transferring light from the faceplate to the sensitive medium.

The foregoing detailed description is to be clearly understood as given by way of illustration and example only, the spirit and scope of this invention being limited solely by the appended claims.

What is claimed is:
1. Pattern forming apparatus comprising
    an image generator having means for projecting an energy beam to a target area of said image generator, and deflection means for causing said energy beam to scan said target area and form an image thereon,
    a support for carrying a medium upon which a pattern is to be formed,
    means for mounting said image generator and support for relative motion in a predetermined direction to enable the image generator to move across the surface of said medium, said image generator being positioned with said target area adjacent the surface of said medium, drive means for relatively moving said image generator and support in said direction in discrete steps to each of a plurality of positions, means for operating said image generator at individual ones of said positions to cause said energy beam to scan said target area and form a scanned image section, each said scanned image section comprising an individual section of a pattern to be formed on said medium, sensing means for sensing relative positions of said image generator and support in said direction, and means responsive to said sensing means for controlling said deflection means to displace an image formed on said target area.

2. The apparatus of claim 1 wherein said means for mounting comprises a beam mounted to said support for motion in a first of two mutually angulated directions, and means for mounting said image generator to said support for motion in the other of said mutually angulated directions.

3. The apparatus of claim 1 including means for providing a set of distortion control signals representing deviations from nominal positions of points of an image formed on said target area, and means responsive to said distortion control signals for controlling said deflection means so as to compensate for said deviations.

4. The pattern forming apparatus of claim 1 wherein said means for operating said image generator to cause said energy beam to scan said target area and form a scanned image section comprises means for causing said energy beam to form a scanned image section only while the image generator is located at one of said positions.

5. The pattern forming apparatus of claim 1 wherein said drive means includes means for causing said image generator to come to rest at each of said positions, wherein said sensing means for sensing relative positions of said image generator and support provides an image correction signal indicative of relative positions of said image generator and support while said image generator is at rest at one of said positions, and wherein said means responsive to said sensing means includes means responsive to said image correction signal for controlling said deflection means.

6. The pattern forming apparatus of claim 1 wherein said drive means includes means for stopping relative motion of said image generator and support at each of said positions, said means for operating said image generator including means operable to cause the energy beam to scan the target area and form a scanned image section only while the image generator is stopped at one of said positions, said drive means including means responsive to said sensing means for controlling relative motion of said image generator and said support, and wherein said means responsive to said sensing means for controlling said deflection means comprises means operable at each of said positions for controlling said deflection means while said image generator is stopped at such position.

7. The apparatus of claim 1 wherein said image generator comprises a cathode ray tube having a fiber optic faceplate that forms said target area, said faceplate being positioned closely adjacent a medium upon which a pattern is to be formed.

8. The apparatus of claim 7 including means for magnetically shielding said cathode ray tube.

9. The apparatus of claim 7 including means for displacing said cathode ray tube from said medium for said relative motion, and means for moving said cathode ray tube to said medium to place said fiber optic faceplate in direct contact with said medium while an image is being formed on said faceplate.

10. Apparatus for exposing a pattern on an energy sensitive medium comprising a support, an energy sensitive medium mounted to said support, an energy beam generator having a target area and beam control means for generating patterns upon said target area, means for movably mounting the energy beam generator adjacent said support, whereby a pattern generated on said target area is transmitted from said target area to expose a medium on said support, drive means for successively positioning said energy beam generator in two dimensions at each of a plurality of sections of said medium, means for operating said energy beam generator at each of said medium sections to generate a pattern section for transmission to and exposure of the respective medium section, each said pattern section comprising one of a plurality of adjacent sections of pattern to be exposed upon said medium, and means for controlling the position of each said pattern section relative to said medium to thereby control relative positions and mutual registration of pattern sections exposed upon said medium, said means for controlling comprising position sensing means for generating feedback signals indicative of position of said energy beam generator relative to said medium, and means responsive to said feedback signals for cooperating with said beam control means to shift said pattern sections generated by said energy beam generator relative to said energy beam generator target area so as to increase mutual registration of exposed pattern sections.

11. The apparatus of claim 10 including means for controlling said beam control means to decrease deviations from nominal positions of points of a pattern generated on said target area.

12. The apparatus of claim 10 including means responsive to said feedback signals for controlling said drive means to position said energy beam generator relative to said medium, said drive means including means for holding said energy beam generator in fixed position relative to said support at each of said plurality of sections of said medium, said means for cooperating with said beam control means to shift said pattern sections comprising means for shifting said pattern sections while said energy beam generator is held in fixed position.

13. The apparatus of claim 10 wherein said beam control means comprises means for providing pattern data in the form of pairs of x, y coordinates, each coordinate pair defining ends of a line segment and wherein the line segments defined by the coordinate pairs collectively define a pattern to be exposed, said beam deflection means comprising beam deflection means and means for transmitting deflection signals representing the coordinate pairs of each line segment end to the beam deflection means to cause the beam to move to successive line segment ends as defined by successive pairs of x, y coordinates, and wherein said means responsive to said feedback signal for cooperating with said beam control means to shift said pattern sections comprises means for combining said feedback signals with the data coordinate pairs to provide corrected deflection signals, and means for feeding said corrected deflection signals to said beam deflection means.

14. The apparatus of claim 10 wherein said energy beam generator comprises a cathode ray tube having a fiber optic faceplate that forms said target area, said faceplate being positioned closely adjacent a medium on said support.

15. The apparatus of claim 14 including means for shifting said cathode ray tube toward said medium to place said faceplate in direct contact with said medium at each of said plurality of sections of said medium.

16. Apparatus for forming a pattern on a selected area of a light sensitive medium, said apparatus comprising
   a support,
   a light sensitive medium fixed to said support,
   a cathode ray tube having a faceplate, a beam generator for projecting an energy beam at the faceplate to form a light spot thereon, and deflection means for deflecting said light beam to cause said light spot to form an optical pattern on said faceplate,
   means for mounting said cathode ray tube and support for motion relative to one another,
   sensing means for sensing position of said cathode ray tube relative to said medium,
   drive means responsive to said sensing means for relatively moving said cathode ray tube and said medium to successively position said faceplate at each of a plurality of different areas of said medium, said drive means being subject to positioning error,
   means for actuating said beam generator and deflection means when said cathode ray tube is at selected ones of said medium areas to form an optical pattern on said faceplate that is exposed upon individual adjacent medium areas, respectively, and
   means responsive to said sensing means when said cathode ray tube is positioned at respective ones of said medium areas for controlling said deflection means to cause the pattern on said faceplate to be shifted in a sense to compensate for said positioning error of said drive means.

17. The apparatus of claim 16 including means for disabling said beam generator during relative motion of said cathode ray tube and medium.

18. The apparatus of claim 16 including means for shifting said cathode ray tube away from said medium during said relative motion.

19. The apparatus of claim 16 including magnetic shield means extending about said cathode ray tube for decreasing effects of stray magnetic fields upon said cathode ray tube.

20. The apparatus of claim 16 wherein said faceplate includes a plurality of optical fibers forming an exterior surface of said faceplate.

21. The apparatus of claim 20 wherein said exterior surface of said faceplate is in direct contact with said medium when said cathode ray tube is positioned at each said medium area, and including means for displacing said exterior surface from said medium during said relative motion.

22. The apparatus of claim 16 wherein the pattern formed on said faceplate is subject to distortion caused by characteristics of said cathode ray tube, and including means for further controlling said deflection means to decrease said distortion.

23. The apparatus of claim 22 wherein said means for further controlling said deflection means comprises means including said cathode ray tube for forming a test pattern, means for measuring distortion of said test pattern at each of a plurality of points on said test pattern, means for generating correction signals representing measured distortion at said points, and means for transmitting said distortion signals to said deflection means.

24. The method of forming a pattern on a light sensitive medium by means of a cathode ray tube having an energy forming faceplate, a beam generator for projecting an energy beam toward said faceplate, and beam deflection circuits, said method comprising the steps of
   positioning a cathode ray tube at a first position adjacent a medium on which a pattern is to be exposed,
   generating first pattern section deflection signals,
   applying said deflection signals to the beam deflection circuits of the cathode ray tube to form on said faceplate a first section of the pattern to be formed, to thereby expose said medium to said first section,
   relatively shifting the cathode ray tube and the medium to position the cathode ray tube at a second position adjacent said medium,
   sensing relative positions of said cathode ray tube and medium when said cathode ray tube is at said second position,
   generating position feedback signals indicative of the sensed relative positions,
   generating second pattern section deflection signals,
   applying said second pattern section deflection signals to the beam deflection circuits to form on said faceplate a second section of the pattern to be formed, to thereby expose said medium to said second section, and
   employing the feedback signals, after said cathode ray tube has been positioned at said second position, to modify said second pattern section deflection signals so as to control the position on said faceplate of said second pattern section in accordance with sensed relative positions of said cathode ray tube and said medium, to thereby decrease relative misalignment of said first and second pattern sections exposed on said medium.

25. The method of claim 24 including the step of disabling said beam generator during said relative shifting.

26. The method of claim 24 including the step of stopping motion of said cathode ray tube at said second position and performing said step of modifying said second pattern section deflection signals while said cathode ray tube is stopped.

27. The method of claim 24 wherein the pattern section formed on said faceplate is subject to distortion caused by characteristics of said cathode ray tube, and including the step of further modifying said deflection signals to decrease said distortion.

28. The method of claim 24 wherein said steps of generating first and second pattern section deflection signals comprise providing a set of x, y coordinate pairs, each pair defining an end of a line segment, said line segments collectively defining a pattern to be formed, and wherein said step of employing the feedback signals to modify said second pattern section deflection signals comprises combining the feedback signals with the x, y coordinate pairs to provide modified deflection signals for application to the beam deflection circuits of the cathode ray tube.

29. The method of forming a pattern on an energy sensitive medium that is activated by an energy beam impinging thereon, said method comprising
   (a) dividing the pattern into a plurality of pattern sections, each of which comprises a section of the pattern that adjoins at least one other section of the pattern,
   (b) positioning an energy beam generator at a first area of said medium,
   (c) operating said beam generator to electronically move an energy beam along a selected path to produce a first beam pattern section corresponding to a first one of said pattern sections and causing energy of said beam pattern section to impinge upon one of said medium areas to produce an activated pattern section thereon,
   (d) relatively shifting said beam generator and medium to position the beam generator at a second area of said medium,
   (e) operating said beam generator to electronically move an energy beam along a selected path to produce a second beam pattern section corresponding to a second one of said pattern sections and causing energy of said second beam pattern section to impinge upon said second area of said medium to produce a second activated pattern area thereon,
   (f) sensing position of said energy beam generator relative to said medium to produce position feedback signals,
   (g) employing said position feedback signals to vary position of the beam pattern section produced by the beam generator relative to the beam generator when the latter is at said second area of said medium so as to decrease misalignment of the second beam pattern section with respect to the pattern section activated on said first area of said medium, and
   (h) repeating steps (d), (e), (f), and (g) for other pattern sections and other medium areas to activate successively different medium areas from successively different beam pattern sections that respectively correspond to successively different ones of said pattern sections.

30. The method of claim 29 including the step of disabling said energy beam generator while said beam generator and medium are being relatively shifted.

31. The method of claim 29 including the steps of stopping said energy beam generator at each of a group of said different medium areas, and performing step (g) while said energy beam generator is stopped.

32. The method of claim 29 including the steps of operating said beam generator to form a test pattern, measuring distortion of said test pattern at each of a plurality of points thereon, and employing the measured distortion at said points to control said energy beam to decrease distortion of the pattern sections produced at each of said areas of said medium.

33. In a vector mode image forming system wherein an image is formed on a target area by a traversing energy beam which is moved along a series of line segments of which each line segment end is defined by x, y coordinates and wherein quantities representing such coordinates of each line segment end are fed to beam deflection control circuits to cause the beam to move to successive line segment ends as defined by successive pairs of x, y coordinates, the method of compensating for deviations in position of individual line segments which deviations are due to characteristics of the image forming system, said method comprising the steps of
   applying deflection signals to the deflection control circuits to cause the beam to produce a predetermined nominal calibration pattern including a number of calibration points, said calibration points deviating from predetermined positions thereof due to characteristics of said image forming system,
   measuring deviation of said calibration points from the predetermined position thereof,
   storing coordinate positions together with corresponding deviations of a number of said calibration points in a correction map table,
   providing a plurality of data coordinate pairs, each defining a coordinate pair of an end of a line segment forming part of an image to be formed by the system,
   extracting from the map table deviation values corresponding to each data coordinate pair,
   combining such extracted deviation values with said data coordinate pairs to obtain corrected data coordinate pairs, and
   applying the corrected data coordinate pairs to the deflection control circuits to cause the beam to move to successive line segment ends as corrected by the extracted deviation values.

* * * * *